United States Patent
Salter et al.

(10) Patent No.: US 8,449,156 B2
(45) Date of Patent: May 28, 2013

(54) AUTOMOTIVE INTERIOR HIDDEN SWITCHING

(75) Inventors: Stuart C. Salter, White Lake, MI (US); Jeffrey Singer, Canton, MI (US); Chi Li, Farmington Hills, MI (US); Cornel Lewis Gardner, Romulus, MI (US); Denis Patrick Igoe, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 576 days.

(21) Appl. No.: 12/725,183

(22) Filed: Mar. 16, 2010

(65) Prior Publication Data

US 2010/0214798 A1    Aug. 26, 2010

Related U.S. Application Data

(63) Continuation-in-part of application No. 12/577,294, filed on Oct. 12, 2009, which is a continuation-in-part of application No. 12/390,495, filed on Feb. 22, 2009, now Pat. No. 8,162,519.

(51) Int. Cl.
    *B60Q 1/00* (2006.01)
(52) U.S. Cl.
    USPC ............ 362/464; 362/276; 362/488; 362/554
(58) Field of Classification Search
    USPC .................. 362/482, 483, 488, 489, 490, 492, 362/501, 511, 545, 554, 555, 276, 464
    See application file for complete search history.

(56) References Cited

U.S. PATENT DOCUMENTS

| | | |
|---|---|---|
| 5,016,934 A | 5/1991 | Pelz |
| 5,448,028 A | 9/1995 | Filion et al. |
| 5,917,165 A | 6/1999 | Platt et al. |
| 5,952,630 A | 9/1999 | Filion et al. |
| 6,013,956 A | 1/2000 | Anderson, Jr. |
| 6,371,548 B1 | 4/2002 | Misaras |
| 6,429,668 B1 | 8/2002 | Billen et al. |
| 6,464,381 B2 | 10/2002 | Anderson, Jr. et al. |
| 6,483,048 B1 | 11/2002 | Bontrager et al. |
| 6,623,069 B2 | 9/2003 | Grimm |
| 6,652,128 B2 | 11/2003 | Misaras |
| 6,714,117 B2 | 3/2004 | Sandbach |
| 6,773,129 B2 | 8/2004 | Anderson, Jr. et al. |
| 6,884,084 B2 | 4/2005 | Shields |
| 7,054,133 B2 | 5/2006 | Orth |
| 7,201,508 B2 | 4/2007 | Misaras |
| 7,342,485 B2 | 3/2008 | Joehl et al. |
| 7,385,308 B2 | 6/2008 | Yerdon et al. |
| 7,445,350 B2 | 11/2008 | Konet et al. |
| 7,594,442 B2 | 9/2009 | Kaiserman et al. |

(Continued)

FOREIGN PATENT DOCUMENTS

EP    1550579 A1    7/2005

*Primary Examiner* — Stephen F Husar
*Assistant Examiner* — Meghan Dunwiddie
(74) *Attorney, Agent, or Firm* — Vichit Chea; Price Heneveld LLP

(57) ABSTRACT

A vehicle interior panel having a substrate with a receiving slot. A support lens is disposed in the receiving slot and includes a light source. A sensor is operably connected to the light source and disposed proximate the support lens. A connector operably links the sensor to the light source through the support lens. A decorative layer extends over the support lens and the sensor.

17 Claims, 6 Drawing Sheets

U.S. PATENT DOCUMENTS

| | | | |
|---|---|---|---|
| 2004/0017687 A1* | 1/2004 | Misaras | 362/489 |
| 2007/0068786 A1 | 3/2007 | Hein | |
| 2008/0202912 A1 | 8/2008 | Boddie et al. | |
| 2009/0229955 A1 | 9/2009 | Hein et al. | |

* cited by examiner

`US 8,449,156 B2`

AUTOMOTIVE INTERIOR HIDDEN SWITCHING

CROSS-REFERENCE TO RELATED APPLICATIONS

This application is a continuation-in-part of U.S. patent application Ser. No. 12/577,294, entitled "HIDDEN LAMP MANUFACTURE PROCESS," filed on Oct. 12, 2009, which is a continuation-in-part of U.S. patent application Ser. No. 12/390,495, entitled "CONCEALED INTERIOR LIGHTING FOR AUTOMOBILES," filed on Feb. 22, 2009 (now U.S. Pat. No. 8,162,519).

FIELD OF THE INVENTION

The present invention generally relates to an automotive interior hidden switching device, and more particularly, relates to an automotive interior hidden switching device for use with automotive interior lighting.

BACKGROUND OF THE PRESENT INVENTION

Interior lighting devices and switches are generally used in vehicles to provide lighting inside a vehicle cabin when exterior ambient lighting is less than desirable.

SUMMARY OF THE PRESENT INVENTION

One aspect of the present invention includes a vehicle interior panel having a substrate with a receiving slot. A support lens is disposed in the receiving slot and includes a light source. A sensor is operably connected to the light source and disposed proximate the support lens. A connector operably links the sensor to the light source through the support lens. A decorative layer extends over the support lens and the sensor.

Another aspect of the present invention includes a vehicle interior lamp assembly having a support lens including a first side and a second side. A sensor is disposed adjacent the second side. A light source and a signal relay device are disposed adjacent the first side. The signal relay device relays a signal from the sensor through the support lens to the light source. A decorative layer extends under the support lens and the sensor.

Yet another aspect of the present invention includes a vehicle interior panel having a decorative layer with exposed and unexposed sides. A substrate layer is adjacent the unexposed side. A support lens is disposed in the substrate layer adjacent the unexposed side. The support lens supports a signal relay device connected to a light source. A sensor is proximate on the unexposed side of the decorative layer and adapted to send signals to the signal relay device, thereby actuating the light source.

These and other aspects, objects, and features of the present invention will be understood and appreciated by those skilled in the art upon studying the following specification, claims, and appended drawings.

DETAILED DESCRIPTION OF EMBODIMENTS

Figure 1:
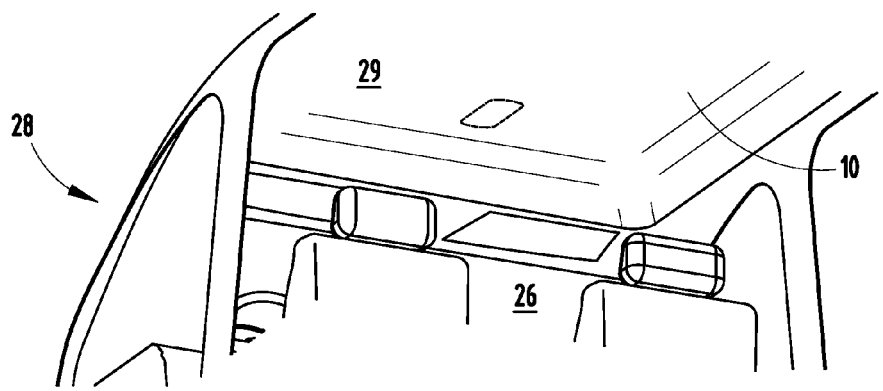
FIG. 1 is a bottom perspective view of one embodiment of a hidden interior switch and light assembly.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
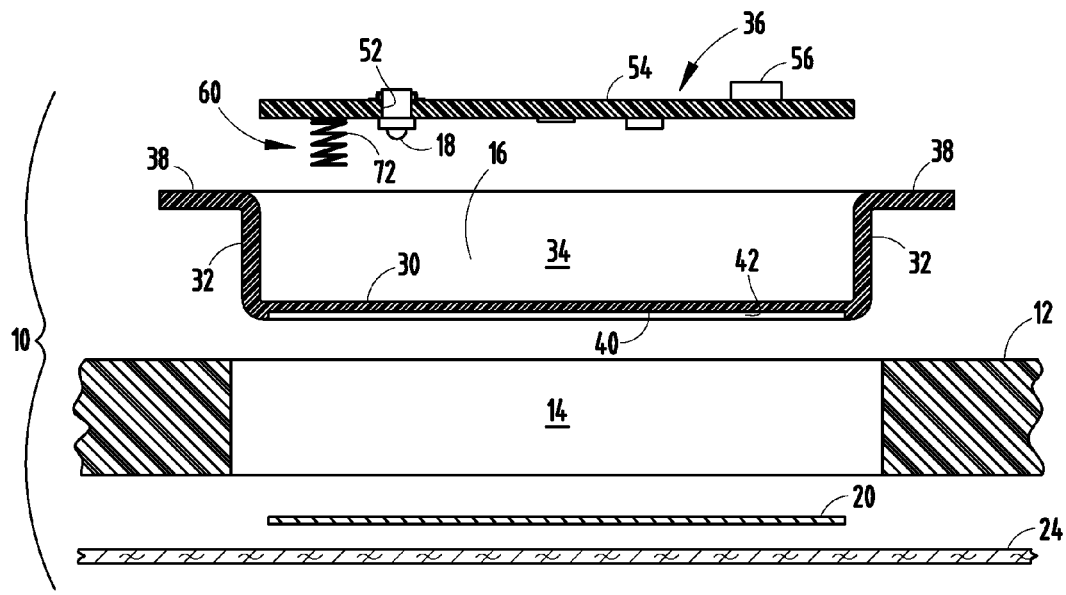
FIG. 2 is a side elevational cross-sectional exploded view of the hidden interior switch and light assembly.
Figure 2A:
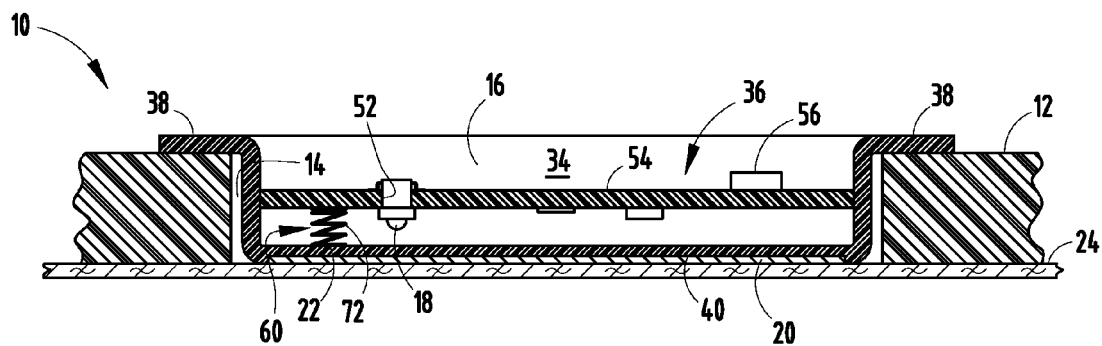
FIG. 2A is a side elevational cross-sectional view of one embodiment of a hidden interior switch and light assembly of FIG. 2.

Referring to FIGS. 1-2A, the reference numeral 10 generally designates a vehicle interior panel having a substrate 12 with a receiving slot 14. A support lens 16 is disposed in the receiving slot 14 and includes a light source 18. A sensor 20 is operably connected to the light source 18 and is disposed proximate the support lens 16. A connector 22 operably links the sensor 20 to the light source 18 through the support lens 16. A decorative layer 24 extends over the support lens 16 and the sensor 20.

With reference to FIGS. 1-7A, the illustrated embodiments disclose light assemblies with hidden switches designed for use in an interior cabin 26 of a vehicle 28. It is contemplated that the vehicle interior panel 10 may be installed as a headliner 29 or any of a variety of panels in any vehicle 28 that includes interior lighting. It is also contemplated that the light assembly may be positioned in other vehicle interior panels of a vehicle including but not limited to the dash, the floor, seating, etc. The substrate of the vehicle interior panel is formed from plastic, wood, fiberglass etc., and provides structural support to the vehicle interior panel. The substrate can be formed into any of a variety of configurations that conform to the dimensions of the interior of the vehicle. The substrate is designed for connection with the decorative layer, which may include leather, fabric, plastic, etc. The decorative layer can be heat-sealed to the substrate or connected to the substrate by fasteners or adhesive. The receive slot disposed in the substrate may be cut from the substrate or formed in the substrate.

As shown in the embodiment illustrated in FIGS. 2 and 2A, the support lens 16 is generally constructed from a clear, transparent, or translucent material, such as plastic, that allows at least some light to pass through the support, which in this embodiment is the support lens 16. The support lens 16 includes a bottom wall 30 and opposing side walls 32 that extend orthogonally from the bottom wall 30. The bottom wall 30 and side walls 32 define a cavity 34 adapted to receive a light assembly 36. It is contemplated that the side walls 32 could be arranged at any angle relative to the bottom wall 30. The support lens 16 also includes a top flange 38 that is disposed on one or more of the side walls 32 and helps secure the support lens 16 in position in the receiving slot 14 of the substrate 12. In the illustrated embodiment, the top flange 38 is integral with the side walls 32, however, it is contemplated that the top flange 38 could be distinct from, but connected to the side walls 32 by adhesive, fasteners, etc. An underside 40 of the bottom wall 30 of the support lens 16 includes a recess 42 adapted to accommodate all of or a portion of the sensor 20. The recess 42 of the illustrated embodiment is a large rectangular cutout that is generally shaped to fit the sensor 20. However, it is contemplated that the recess 42 may include a general taper along the underside 40 of the bottom wall 30 that does not conform to the exact shape of the sensor 20. It is also contemplated that the recess 42 may be eliminated and that an ultra thin sensor with a very small profile may be incorporated into the light assembly 36.

Referring again to FIGS. 2 and 2A, the light assembly 36 is disposed inside the cavity 34 of the support lens 16 and is supported by one or more side walls 32. More specifically, the light source 18 of the light assembly 36 extends through an aperture 52 in a printed circuit board (PCB) 54, such that when the light source 18 is activated, light emitted from the light source 18 passes through the support lens 16, the sensor 20, and the decorative layer 24. To provide sufficient light to the interior cabin 26 of the vehicle 28, it is contemplated that a Light Emitting Diode (LED) with relatively high intensity may be used as the light source 18, although other high intensity light sources could also be used. A light source driver 56 is operably connected with the light source 18 and provides sufficient power to the light source 18 to emit the necessary lighting through the support lens 16, sensor 20, and decorative layer 24 and into the interior of the cabin 26.

It is contemplated that the light source 18 may have multiple operating intensities. For example, the light source 18 may operate at a high intensity and cast light equivalent to a typical exposed dome light as well as a low intensity that provides dim lighting to the interior of the cabin 26. It is further contemplated that the light source 18 may include an indicator intensity, which is very low and serves only to indicate to a user where the hidden switch of sensor 20 is positioned relative to the headliner 29. Alternatively, an indicator light, separate from the light source 18, may serve the same function and may be positioned adjacent the sensor 20.

As also shown in the embodiment of FIGS. 2 and 2A, the hidden switch or sensor 20 is a capacitive sensor that is flexible and substantially thin. The sensitivity of the sensor 20 allows the sensor 20 to detect movement of an object as the object passes by the sensor 20. The sensor 20 detects a change in capacitance when the object passes by the sensor 20 or contacts the decorative layer 24 adjacent the sensor 20. It is contemplated that a conductive ink may be applied to the decorative layer 24 proximate the sensor 20 to increase the sensitivity of the sensor 20. When the sensor 20 detects a change in capacitance, a signal is sent through a signal relay device 60 to the light source driver 56, which subsequently activates the light source 18.

The signal relay device 60 is disposed inside the cavity of the support lens 16 and is sensitive enough to detect a signal emitted by the sensor 20 through the support lens 16. It is contemplated that the signal relay device 60 is capable of receiving signals through the material of the support lens 16. Alternatively, the signal relay device 60 may be in the form of the connector 22 that extends through a small aperture in the support lens 16 and connects directly with the sensor 20. In either instance, the signal relay device 60 transmits the signal from the sensor 20 to the light source driver 56, which subsequently activates the light source 18 (if the light source 18 is currently off) or deactivates the light source 18 (if the light source 18 is currently on).

Figure 3:
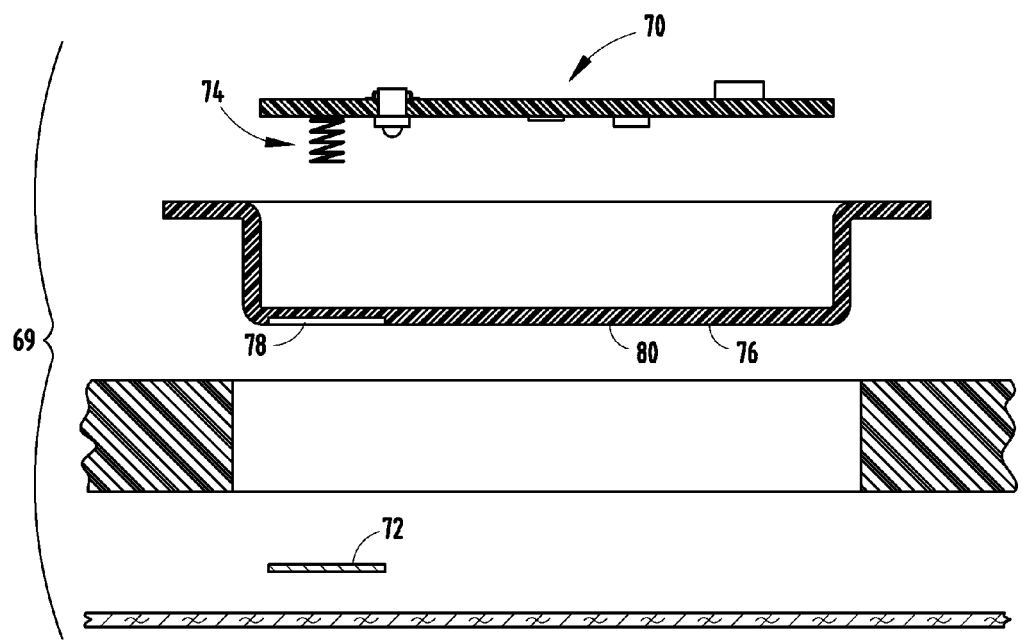
FIG. 3 is a side elevational cross-sectional exploded view of the hidden interior switch and light assembly.
Figure 3A:
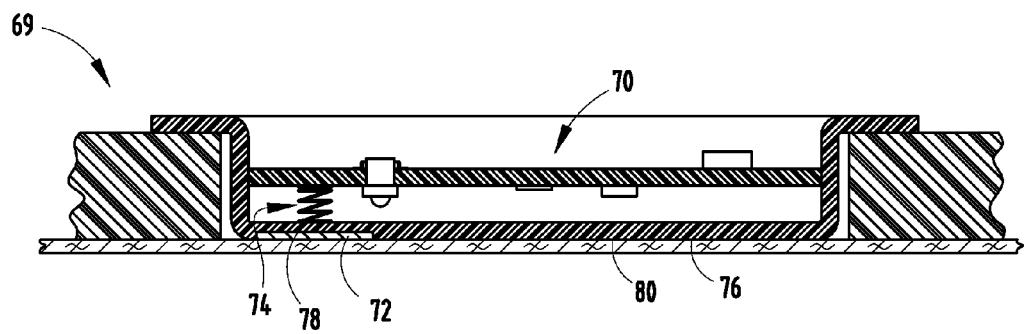
FIG. 3A is a side elevational cross-sectional view of another embodiment of a hidden interior switch and light assembly of FIG. 3.

Referring now to FIGS. 3 and 3A, another embodiment of a vehicle interior panel 69 includes a lighting assembly 70 having a small sensor 72 that is disposed proximate a signal relay device 74 below a support lens 76. The illustrated embodiment shows a small recess 78 defined by a small rectangular cutout that is generally shaped to fit the small sensor 72. It is contemplated that the recess 78 may include a general taper along the underside of a bottom wall 80 of the support lens 76 that does not conform to the exact shape of the small sensor 72. It is also contemplated that the recess 78 may be thinner than the small sensor 72 or eliminated completely. An ultra thin sensor may also be incorporated into the light assembly 70. The illustrated embodiment otherwise acts similar to the embodiment discussed above with regard to FIGS. 2 and 2A.

Figure 4:
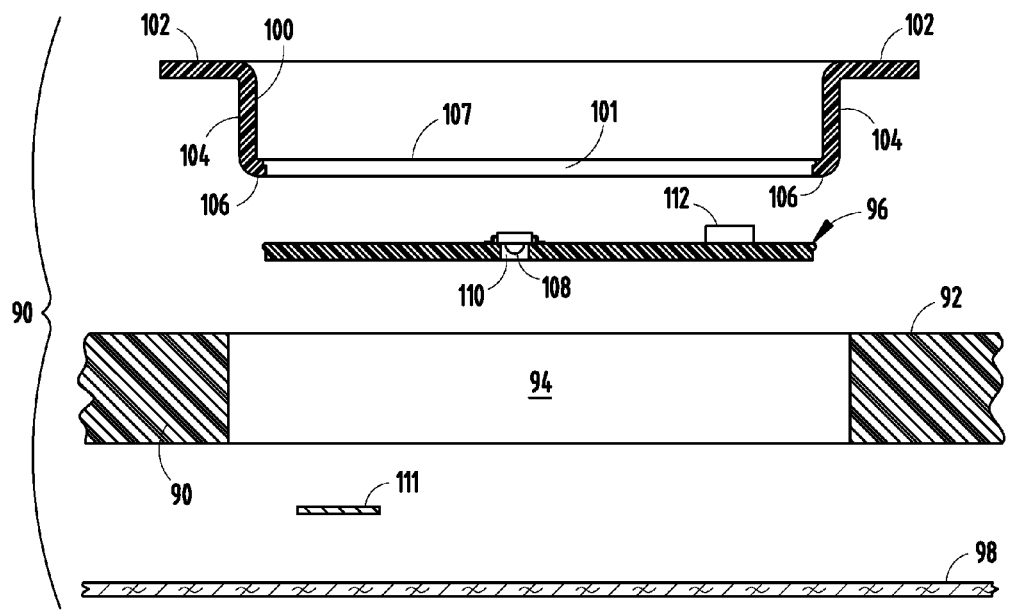
FIG. 4 is a side elevational cross-sectional exploded view of the hidden interior switch and light assembly.
Figure 4A:
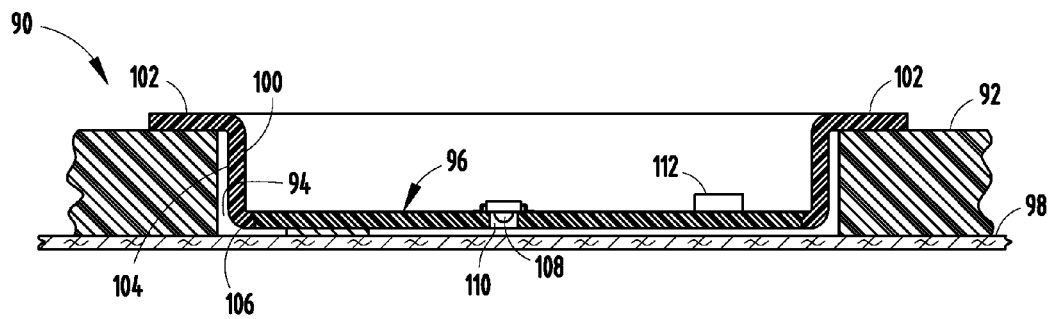
FIG. 4A is a side elevational cross-sectional view of another embodiment of a hidden interior switch and light assembly of FIG. 4.

Referring now to FIGS. 4 and 4A, yet another embodiment of a vehicle interior panel 90 includes a substrate 92 having a slot 94 adapted to secure a lighting assembly 96. A decorative layer 98 extends adjacent to the substrate 92 and is connected to the substrate 92 in one of the manners discussed above.

The lighting assembly 96 is positioned in the slot 94 of the substrate 92. The lighting assembly 96 includes a support lens in the form of a support frame 100 that extends around the lighting assembly 96 and supports the lighting assembly 96 in the slot 94 and has an open inner area 101. The support frame 100 includes a top flange 102 that is integral with a plurality of downwardly extending side walls 104. A distal end 106 of at least one of the downwardly extending side walls 104 connects with a PCB 107 or other light source supporting structure. In this embodiment, a light source 108 is positioned in an aperture 110 extending through the PCB 107 and a sensor 111 is disposed below the PCB 107. The PCB 107 includes a light source driver 112 that is operably linked with the light source 108. When the light source driver 112 receives a signal that the capacitance near the sensor 111 has changed, the light source driver 112 activates the light source 108, thereby emitting light into the interior cabin 26. In the illustrated embodiment, the sensor 111 is positioned below the PCB 107, between the PCB 107 and the decorative layer 98. The illustrated embodiment of FIGS. 4 and 4A otherwise acts similar to the embodiment discussed above with reference to FIGS. 2 and 2A.

Figure 5:
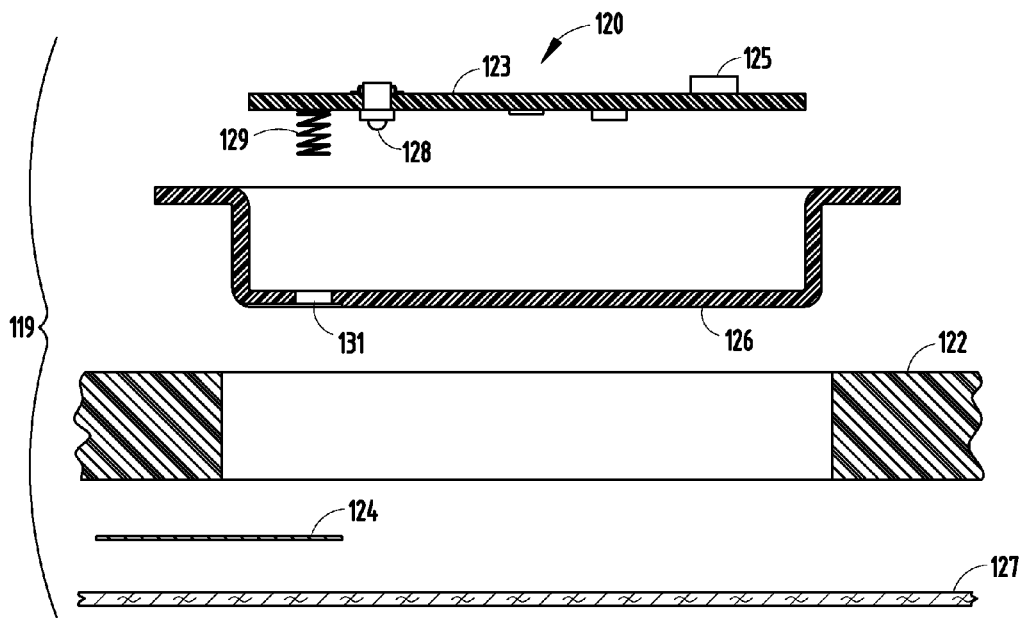
FIG. 5 is a side elevational cross-sectional exploded view of the hidden interior switch and light assembly.
Figure 5A:
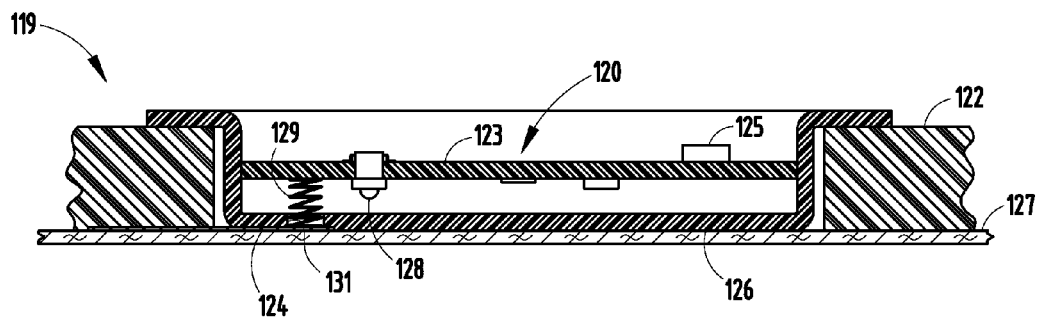
FIG. 5A is a side elevational cross-sectional view of another embodiment of a hidden interior switch and light assembly of FIG. 5.

Referring now to the embodiment illustrated in FIGS. 5 and 5A, a vehicle interior panel 119 includes a lighting assembly 120 positioned in a substrate 122 in a similar manner to that described in FIGS. 3 and 3A. The illustrated embodiment, however, includes a large sensor 124 positioned below a support lens 126 and above a decorative layer 127 forward of a light source 128. The lighting assembly 120 includes a PCB 123, a light source driver 125, and a signal relay device 129. The signal relay device 129 may rest on the support lens 126 or extend through an aperture 131 of the support lens 126 and contact the large sensor 124. It is contemplated that the large sensor 124 could be of virtually any size and could be positioned rearward of the light source 128 instead. It is also contemplated that a conductive ink, as discussed in further detail above, may be disposed on the decorative layer 127, such that contact with the decorative layer 127 or even the close proximity of an object (such as the hand of a user) to the decorative layer 127 will be detected by the large sensor 124 through the conductive ink.

Figure 6:
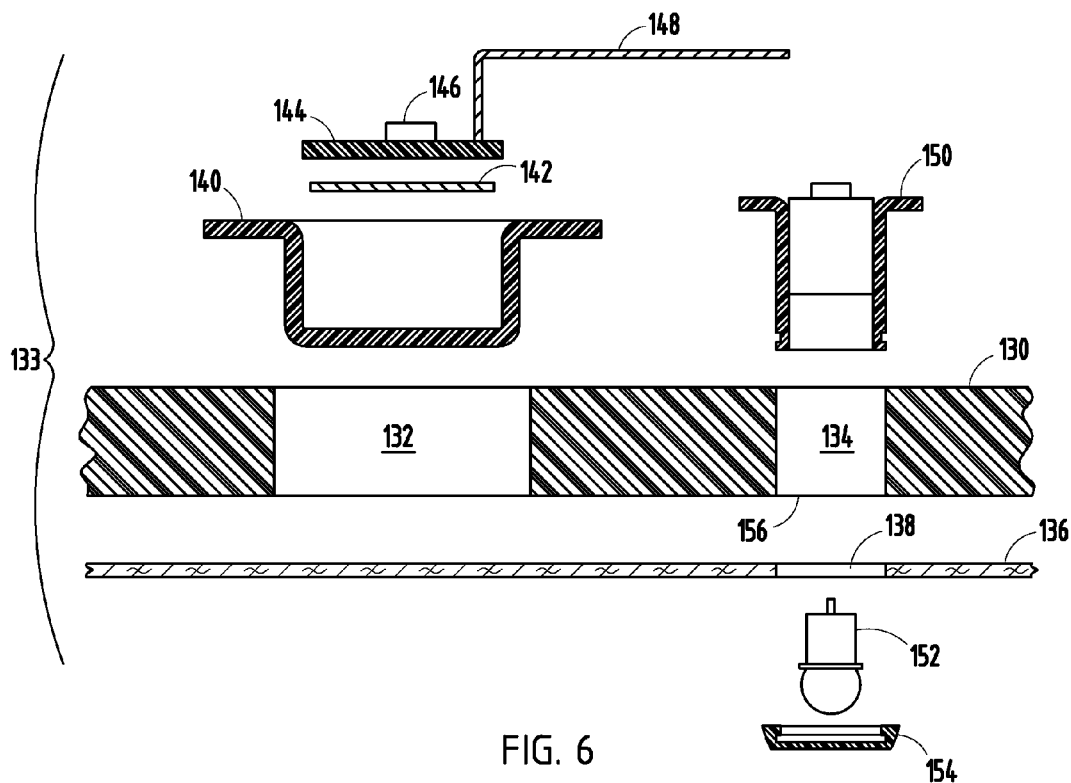
FIG. 6 is a side elevational cross-sectional exploded view of the hidden interior switch and light assembly.
Figure 6A:
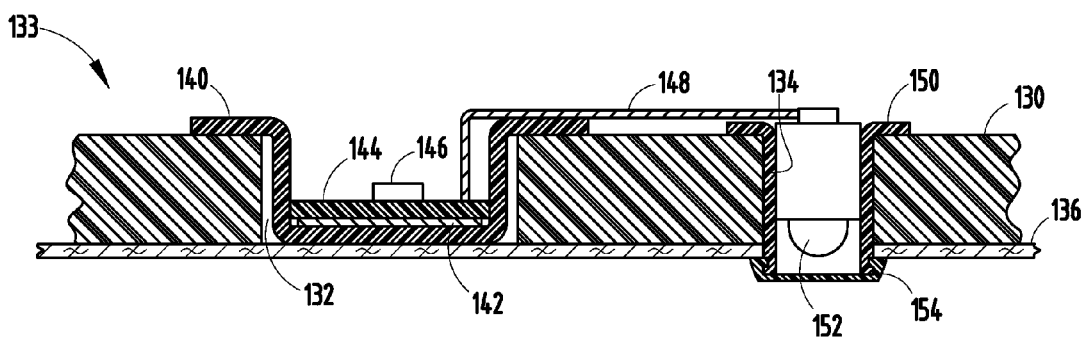
FIG. 6A is a side elevational cross-sectional view of another embodiment of a hidden interior switch and light assembly of FIG. 6.

Another alternative embodiment is illustrated in FIGS. 6 and 6A. In this embodiment, a vehicle interior panel 133 having a substrate 130 is provided with first and second slots 132, 134 that are spaced a predetermined distance from one another. The substrate 130 is connected to a decorative layer 136, which includes an aperture 138 adjacent the second slot 134. A support lens 140 is disposed in the first slot 132. A sensor 142 and a PCB 144 having a light source driver 146 are disposed inside the support lens 140. A power cord 148 extends from the PCB 144 and connects the PCB 144 to a light source housing 150 that supports a light source 152, such as the incandescent bulb shown. The light source housing 150 is disposed in the second slot 134. The light source housing 150 includes a cap 154 that extends over a bottom opening 156 of the light source housing 150 and protects the light source 152. The cap 154 may be threadably secured to the light source housing 150 or connected by a friction fit, interference fit, adhesive, etc.

During use, a user simply waves a hand or object by the support lens 140, which motion is detected as a change in capacitance by the sensor 142. The sensor 142 then sends a signal to the light source driver 146 to activate the light source 152 inside the light source housing 150. The light source 152 is then activated and light is emitted through the cap 154 and into the interior of the cabin 26.

Figure 7:
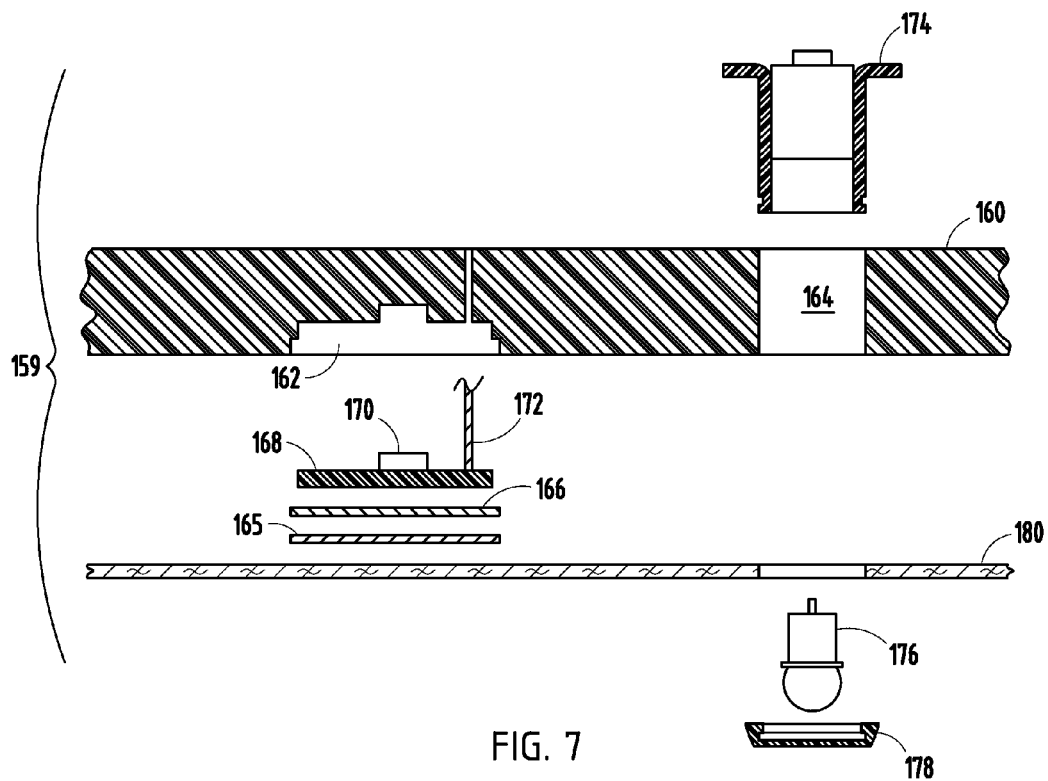
FIG. 7 is a side elevational cross-sectional exploded view of the hidden interior switch and light assembly.
Figure 7A:
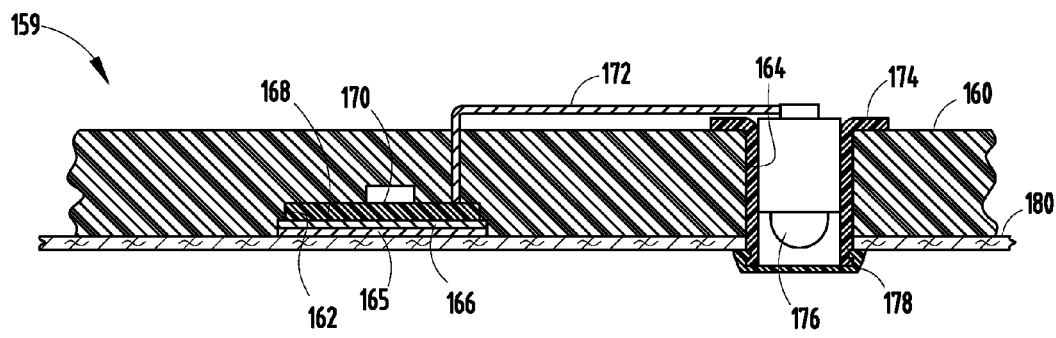
FIG. 7A is a side elevational cross-sectional view of another embodiment of a hidden interior switch and light assembly of FIG. 7.

Referring now to the alternative embodiment illustrated in FIGS. 7 and 7A, a vehicle interior panel 159 includes a substrate 160 having a light assembly recess 162 spaced a predetermined distance from a forward slot 164. The recess 162 is sized to accommodate a support lens 165, a sensor 166, a PCB 168, a light source driver 170, and a power cord 172. The power cord 172 connects the PCB 168 to a light source housing 174 that supports a light source 176, such as the incandescent bulb shown. The light source housing 174 is disposed in the forward slot 164. The light source housing 174 includes a cap 178 that extends over and protects the light source 176. The cap 178 may be threadably secured to the light source housing 174 or connected by a friction fit, interference fit, adhesive, etc. Unlike the embodiment shown in FIGS. 6 and 6A, the sensor 166 of this embodiment does not have a support lens. Rather, the sensor 166 is disposed between the PCB 168 and a decorative layer 180.

During use, a user simply waves a hand or object by the sensor 166, which motion is detected as a change in capacitance by the sensor 166. The sensor 166 then sends a signal to the light source driver 170 to activate the light source 176. The light source 176 is then activated and light is emitted through the cap 178 and into the interior of the cabin 26. The location of the sensor 166 may be discernable by indicia at or near the sensor 166, such as ink, a change of material, an indicator light, a material texture change, etc.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle interior panel comprising:
   a substrate with a receiving slot;
   a support lens disposed in the receiving slot and including a light source;
   a sensor at least partially received in a recess in the support lens and operably connected to the light source;
   a connector operably linking the sensor to the light source through the support lens; and
   a decorative layer extending over the support lens and the sensor.

2. The vehicle interior panel of claim 1, wherein the sensor is disposed between the support lens and the decorative layer.

3. The vehicle interior panel of claim 1, wherein a portion of the sensor is disposed between the substrate and the decorative layer.

4. The vehicle interior panel of claim 1, wherein the light source is a light emitting diode.

5. The vehicle interior panel of claim 1, wherein the light source and connector are operably connected with a printed circuit board that is disposed in a cavity defined by the support lens.

6. A vehicle interior lamp assembly comprising:
   a support lens having a first side and a second side;
   a sensor disposed adjacent the second side;
   a light source and a signal relay device disposed adjacent the first side, wherein the signal relay device relays a signal from the sensor through the support lens to the light source; and
   a decorative layer extending under the support lens and the sensor.

7. The vehicle interior lamp assembly of claim 6, wherein the signal relay device extends through the support lens and connects with the sensor.

8. The vehicle interior lamp assembly of claim 6, wherein the light source at least partially emits light through the sensor.

9. The vehicle interior lamp assembly of claim 6, wherein the sensor is at least partially received in a recess in the support lens.

10. The vehicle interior lamp assembly of claim 6, wherein the light source and connector are operably connected with a printed circuit board that is disposed in a cavity defined by the support lens.

11. A vehicle interior panel comprising:
    a decorative layer with exposed and unexposed sides;
    a substrate layer adjacent the unexposed side;
    a support lens disposed in the substrate layer adjacent the unexposed side, the support lens supporting a signal relay device connected to a light source; and
    a sensor disposed between the support lens and a printed circuit board proximate the unexposed side of the decorative layer and adapted to send signals to the signal relay device, thereby actuating the light source.

12. The vehicle interior panel of claim 11, wherein the substrate layer is a frame structure having a plurality of walls that define an open inner area.

13. The vehicle interior panel of claim 12, further comprising:
    a printed circuit board extending between the plurality of walls.

14. The vehicle interior panel of claim 11, wherein the light source is disposed in a separate light source housing.

15. The vehicle interior panel of claim 14, wherein the light source housing extends at least partially through the decorative layer.

16. The vehicle interior panel of claim 15, wherein the light source housing is positioned in a slot spaced a predetermined distance from the support lens.

17. The vehicle interior panel of claim 11, wherein at least a portion of the sensor is disposed inside a recess below the support lens.

* * * * *